United States Patent
Adika et al.

(10) Patent No.: US 11,307,956 B2
(45) Date of Patent: Apr. 19, 2022

(54) AUTONOMOUS BEHAVIOR REASONING ANALYSIS

(71) Applicant: WALKME LTD, Tel-Aviv (IL)

(72) Inventors: Dan Adika, Jerusalem (IL); Rephael Sweary, Ramat-Gan (IL); David Ilievsky, Tel-Aviv (IL); Gal Bien, Kfar-Yehoshua (IL); Ilan Eiland, Givataim (IL); Omri Eyal, Kochav Yair (IL)

(73) Assignee: WalkMe LTD, Tel Aviv-Jaffa (IL)

( * ) Notice: Subject to any disclaimer, the term of this patent is extended or adjusted under 35 U.S.C. 154(b) by 628 days.

(21) Appl. No.: 16/304,351

(22) PCT Filed: Feb. 23, 2017

(86) PCT No.: PCT/IL2017/050234
§ 371 (c)(1),
(2) Date: Nov. 26, 2018

(87) PCT Pub. No.: WO2017/212466
PCT Pub. Date: Dec. 14, 2017

(65) Prior Publication Data
US 2019/0196932 A1    Jun. 27, 2019

Related U.S. Application Data

(60) Provisional application No. 62/347,214, filed on Jun. 8, 2016.

(51) Int. Cl.
*G06F 11/34* (2006.01)
*G06Q 30/02* (2012.01)
(Continued)

(52) U.S. Cl.
CPC ........ *G06F 11/3438* (2013.01); *G06F 3/0481* (2013.01); *G06F 8/38* (2013.01);
(Continued)

(58) Field of Classification Search
CPC ...... G06F 11/3438; G06F 3/0481; G06F 8/38; G06F 11/3447; G06Q 30/0246; G06Q 30/0244; G06Q 30/0243
See application file for complete search history.

(56) References Cited

U.S. PATENT DOCUMENTS

| 2012/0159345 A1* | 6/2012 | Gonsalves | G06F 16/9535 |
| | | | 715/745 |
| 2014/0075371 A1* | 3/2014 | Carmi | G06F 9/451 |
| | | | 715/781 |

(Continued)

FOREIGN PATENT DOCUMENTS

WO    0127850 A2    4/2001

OTHER PUBLICATIONS

European Search Report and Written Opinion issued by the European Patent Office for corresponding European Patent Application No. EP 17809830.7, dated Jan. 22, 2020.

*Primary Examiner* — Justin R. Blaufeld
(74) *Attorney, Agent, or Firm* — Robert Goozner (57) ABSTRACT

A computer implemented method of adapting an application according to user interaction comprising using one or more processors for executing a code for collecting autonomously a plurality of action events describing a plurality of actions taken by a plurality of users to navigate through a plurality of pages presented by an application to accomplish one or more goals of the application, the plurality of pages are presented on a GUI at a plurality of user devices used by the plurality of users, analyzing the action events to identify one or more behavioral patterns of at least some of the users for accomplishing the goal(s) and generating automatically one or more recommended adaptations for the application according to the behavioral pattern(s) to adapt a layout of the (Continued)

application in order to increase a probability for one or more users to successfully accomplish the goal(s).

24 Claims, 4 Drawing Sheets

(51) Int. Cl.
 *G06F 3/0481* (2022.01)
 *G06F 8/38* (2018.01)
(52) U.S. Cl.
 CPC ..... *G06F 11/3447* (2013.01); *G06Q 30/0243* (2013.01); *G06Q 30/0244* (2013.01); *G06Q 30/0246* (2013.01)

(56) References Cited

U.S. PATENT DOCUMENTS

| | | | | |
|---|---|---|---|---|
| 2014/0359584 | A1* | 12/2014 | Chu | G06F 8/70 717/131 |
| 2016/0335333 | A1* | 11/2016 | Desineni | G06F 16/9558 |
| 2017/0286558 | A1* | 10/2017 | Kelleher | H04L 67/02 |

* cited by examiner

AUTONOMOUS BEHAVIOR REASONING ANALYSIS

RELATED APPLICATION

This application claims the benefit of priority under 35 USC § 119(e) of U.S. Provisional Patent Application No. 62/347,214 filed on Jun. 8, 2016, the contents of which are incorporated herein by reference in their entirety.

FIELD AND BACKGROUND OF THE INVENTION

The present invention, in some embodiments thereof, relates to increasing accomplishment of application goal(s) and, more particularly, but not exclusively, to increasing accomplishment of application goal(s) by analyzing autonomously a structure of the application and usage behavior of a plurality of users using the application.

The number and variety of applications, websites services and/or the like is ever increasing to encompass an extremely wide range of uses, markets, users and/or objectives, for example, control, gaming, commerce, life style, social and/or the like.

Since the applications may typically be used by human users, the applications may be adapted to allow a satisfactory user interface and/or user experience in order to achieve a high success rate for the users using the application to accomplish the goals set for the application.

SUMMARY OF THE INVENTION

According to a first aspect of the present invention there is provided a computer implemented method of adapting an application according to user interaction comprising using one or more processors for executing a code for:
- Collecting autonomously a plurality of action events describing a plurality of actions taken by a plurality of users to navigate through a plurality of pages presented by an application to accomplish one or more goals of the application, the plurality of pages are presented on a GUI at a plurality of user devices used by the plurality of users.
- Analyzing the action events to identify one or more behavioral patterns of at least some of the users for accomplishing the goal(s).
- Generating automatically one or more recommended adaptations for the application according to the behavioral pattern(s) to adapt a layout of the application in order to increase a probability for one or more users to successfully accomplish the goal(s).

Autonomously tracking the interaction of the users with the application and analyzing the interaction to identify the behavioral pattern(s) and generate the adaptation recommendations may present significantly improve the user experience and/or the ability of the users to comprehend the application flow, required actions, and/or the like. This may lead to a significant increase in the level of accomplishment of the goal(s) expected by the application provider from the users using the application.

According to a second aspect of the present invention there is provided a system for adapting an application according to user interaction, comprising one or more processors adapted to execute a code. The code comprises:
- Code instructions to collect a plurality of action events describing a plurality of actions taken by a plurality of users to navigate through a plurality of pages presented by an application to accomplish one or more goals of the application. The plurality of pages are presented on a graphical user interface (GUI) at a plurality of user devices used by the plurality of users.
- Code instructions to analyze the plurality of action events to identify one or more behavioral patterns of at least some of the plurality of users for accomplishing the one or more goals.
- Code instructions to generate automatically one or more recommended adaptations for the application according to the one or more behavioral patterns to adapt a layout of the application in order to increase a probability for one or more user to successfully accomplish the one or more goals.

With reference to the first and/or the second aspects of the invention, according to a first implementation, the application is a web based application accessible by a web browser used by one or more of the plurality of users. This allows monitoring, analyzing and generating the adaptation recommendations for web based applications which may present a significant share of the applications market.

With reference to first and/or the second aspects of the invention, according to a second implementation, the application is a local application executed locally by a device associated with one of the plurality of users. This allows monitoring, analyzing and generating the adaptation recommendations for locally executed applications which may present another significant share of the applications market.

With reference to first and/or the second aspects of the invention and/or any of the previous implementations, according to a third implementation, the autonomous collection of the plurality of actions is conducted independently of the application with no prior knowledge of the application. This allows applying the method to practically any application without requiring adaptation, customization, porting and/or the like to fit the monitored application thus avoiding effort and/or costs involved with deployment of the monitoring means for the application.

Optionally, with reference to first and/or the second aspects of the invention and/or any of the previous implementations, according to a fourth implementation, each of the plurality of users is assigned a unique identification tag to identify the user in a plurality of sessions in which the each user uses the applications. Identifying (returning) users who use the application during a plurality of sessions may allow better monitoring of the action events initiated by the identified users and improved association of the users with the identified behavioral patterns.

With reference to first and/or the second aspects of the invention and/or any of the previous implementations, according to a fifth implementation, at least a subset of the plurality of action events initiated by a respective one of the plurality of users is retrieved once the subset exceeds a pre-defined threshold level. Transferring even a limited amount of the collected monitored information, i.e. limited number of action events between the user devices and the analysis system may present a communication overhead. In order to reduce the overhead, the collected monitored information (action events) may be temporarily stored at each of the user devices and only when the number of activity events exceeds the pre-defined threshold level, the monitored information is sent from the user device to the analysis system.

With reference to first and/or the second aspects of the invention and/or any of the previous implementations, according to a sixth implementation, the plurality of action events are identified by identifying one or more of a plurality of displayed objects in each of the plurality of pages and detecting one or more action of the plurality of actions made by one or more of the plurality of users to interact with the one or more displayed objects. The action is a member of a group: select, point, click, swipe, hoover and type. By monitoring the plurality of user interaction events, the collected monitoring information may be highly comprehensive to enable improved analysis of the monitoring information thus increasing the integrity, authenticity and/or reliability of the identified behavioral patterns which may lead to improving the generated adaption recommendations.

With reference to first and/or the second aspects of the invention and/or any of the previous implementations, according to a seventh implementation, the analysis is conducted on a flow graph model created to represent the application. The flow graph model includes a plurality of nodes each associated with one of the plurality of pages and a plurality of edges each connecting a pair of the plurality of nodes. Each of the plurality of edges is assigned with a weight indicating a probability of transition between a respective pair of the plurality of pages.

Modeling the application as a graph with nodes and edges may significantly simplify the representation of the application and allow analyzing the application flow using a plurality of methods, tools, algorithms and/or the like that are available, developed and/or customized for graph models.

With reference to first and/or the second aspects of the invention and/or any of the previous implementations, according to an eighth implementation, the analysis comprises analyzing the plurality of action events taken by one or more of the plurality of users over a plurality of sessions in which the user uses the applications. Prolonged monitoring of the users over a plurality of session over a time period may improve identification of the behavioral patterns and may thus improve the generated adaptation recommendations.

With reference to first and/or the second aspects of the invention and/or any of the previous implementations, according to a ninth implementation, the analysis automatically identifies the one or more goal by analyzing at least some of the plurality of actions. By identifying the goal(s) of the application, the analysis module may better understand the context of the monitored application and may therefore better identify, classify and/or analyze the behavioral pattern(s) identified for the users. This may also improve the generated adaptation recommendation(s). The automatic detection may further reduce complexity, effort and/or costs that for integrating, customizing and/or porting the analysis module to the monitored application.

With reference to first and/or the second aspects of the invention and/or any of the previous implementations, according to a tenth implementation, the analysis comprises identifying one or more errors made by one or more of the plurality of users in one or more of the plurality of pages. Identifying the errors may be an essential part of the identified behavioral pattern(s) and in particular points of difficulty in the navigation flow of the application in which the users experience difficulty to follow the flow and/or operate according to the application's designed methodology.

With reference to first and/or the second aspects of the invention and/or any of the previous implementations, according to an eleventh implementation, the analysis comprises clustering the plurality of users to a plurality of user segments to associate the one or more behavioral patterns with one or more of the plurality of user segments. Segmenting the users to user segments may improve identification of the behavioral pattern(s), in particular associating the behavioral pattern(s) with the identified user segments. Moreover, the generated adaptation recommendations may be adapted according to each target user segment and may thus improve the efficiency of the suggested adaptations.

With reference to first and/or the second aspects of the invention and/or any of the previous implementations, according to a twelfth implementation, the analysis comprises identifying one or more barrier pages of the plurality of pages. The barrier page(s) reduce the probability for at least some of the plurality of users to successfully accomplish the goal(s). Identifying barrier pages in which the users may experience difficulty to follow the flow and/or operate according to the application's designed methodology, may allow focusing on the barrier pages in order to improve the user experience and/the ability of the users to comprehend the application flow, required actions, and/or the like.

Optionally, with reference to first and/or the second aspects of the invention and/or any of the previous implementations, according to a thirteenth implementation, the analysis comprises rating a significance of each of the plurality of action events with respect to the probability of the user(s) to successfully accomplish the goal(s). Rating the significance of each action event to the overall successful accomplishment of the goal(s) by the user may allow the analysis module to concentrate (focus) on the major contributing action events which influence the successful accomplishment of the goal(s) by the user. Generating adaptation recommendation(s) to adapt the application layout to overcome potential problems concerning the major contributing action events may present more benefit to the application vendor compared to low contributing action events.

Optionally, with reference to first and/or the second aspects of the invention and/or any of the previous implementations, according to a fourteenth implementation, the analysis comprises analyzing an active time duration and an idle time duration spent by each of the plurality of users in each of the plurality of pages in order to determine a level of understanding of the page by the user. The idle time spent by the user at each of the pages may be indicative of difficulties the user experiences in following the page's flow, activity and/or the like and may therefore be used for identifying the behavioral pattern(s).

Optionally, with reference to first and/or the second aspects of the invention and/or any of the previous implementations, according to a fifteenth implementation, the analysis comprises analyzing one or more context characteristics of at least some of the plurality of action events to identify the one or more behavioral patterns. The one or more context characteristics are members of a group consisting of: a time of day, a date and a location of the user. The action events may be correlated and/or dependent on the context characteristics. Therefore associating the actions events with their context characteristics may improve the identification of the behavioral pattern(s).

Optionally, with reference to first and/or the second aspects of the invention and/or any of the previous implementations, according to a sixteenth implementation, the analysis comprises estimating one or more intentions of one or more of the plurality of users by analyzing the plurality of action events initiated by the one or more users. Different users may have different intentions even while using the same application and/or navigating through the same page. Therefore identifying the intentions of the users may allow the analysis module to better estimate if the users accomplished the goal(s) they actually intended to accomplish.

With reference to first and/or the second aspects of the invention and/or any of the previous implementations, according to a seventeenth implementation, the one or more recommended adaptations include a suggested modification to change a navigation path of the application. The navigation path of the application may have a major impact on the probability for the users to successfully accomplish the goal(s) of the application. Therefore directing the adaptation recommendation(s) to improve the layout may significantly improve the probability for the users to successfully accomplish the goal(s) of the application.

Optionally, with reference to first and/or the second aspects of the invention and/or any of the previous implementations, according to an eighteenth implementation, the one or more recommended adaptations include a suggested modification to manipulate a user interface of one or more of the plurality of pages in order to improve a user experience provided by the application. The user experience path of the application may have a major impact on the probability for the users to successfully accomplish the goal(s) of the application. Therefore directing the adaptation recommendation(s) to improve the user experience may significantly improve the probability for the users to successfully accomplish the goal(s) of the application.

Optionally, with reference to first and/or the second aspects of the invention and/or any of the previous implementations, according to a nineteenth implementation, the one or more recommended adaptations include a suggested modification to manipulate one or more objects displayed in one or more of the plurality of pages. The manipulation is selected from a group consisting of: addition, removal, change and relocation. The content presented by the application (page) may have a major impact on the probability for the users to successfully accomplish the goal(s) of the application. Therefore directing the adaptation recommendation(s) to improve the content presentation may significantly improve the probability for the users to successfully accomplish the goal(s) of the application.

Optionally, with reference to first and/or the second aspects of the invention and/or any of the previous implementations, according to a twentieth implementation, the one or more recommended adaptations include a suggested modification to manipulate one or more guidance instructions presented for the application in one or more of the plurality of pages to assist the plurality of users in the navigation. The manipulation is selected from a group consisting of: addition, removal, change and relocation. Help and/or guidance instructions through the application pages may significantly increase the probability for the users to successfully accomplish the goal(s) of the application. Therefore directing the adaptation recommendation(s) to improve the guidance instructions may significantly improve the probability for the users to successfully accomplish the goal(s) of the application.

Optionally, with reference to first and/or the second aspects of the invention and/or any of the previous implementations, according to a twenty first implementation, the one or more recommended adaptations are provided to a provider of the application. This may allow the application vendor to take actions and adjust the application according to the adaptation recommendation(s) to increase the probability for the users to successfully accomplish the goal(s) of the application.

Optionally, with reference to first and/or the second aspects of the invention and/or any of the previous implementations, according to a twenty second implementation, the provider of the application is alerted in case a change is detected in the one or more behavioral patterns. As the behavioral patterns of the user may be dynamic and change over time, alerting the application vendor may allow the application vendor to take action to encounter the changes in the behavioral patterns.

Optionally, with reference to first and/or the second aspects of the invention and/or any of the previous implementations, according to a twenty third implementation, the application is automatically adapted according to the one or more recommended adaptations. Automatically adjusting the application according to the identified behavioral patterns may allow increased response time to overcome identified points of difficulty in the application where the user may experience difficulty to follow the application flow, directions and/or the like. This may further reduce effort and/or costs involved in manually adjusting the application (typically offline) and applying the adjustments by updating the application and/or part thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

The present invention, in some embodiments thereof, relates to increasing accomplishment of application goal(s) and, more particularly, but not exclusively, to increasing accomplishment of application goal(s) by analyzing autonomously a structure of the application and usage behavior of a plurality of users using the application.

According to some embodiments of the present invention, there are provided methods, systems and computer program products for tracking interaction of a plurality of users with an application, analyzing the interaction, identifying one or more behavioral patterns of the users and generating one or more recommendations for adapting the application in order to increase probability of the users accomplishing one or more goals of the application. The application may be executed on client terminals used by the users as a local application, a website accessible using a web browser, a service provided by a local agent and/or the like. The application and/or website may comprise one or more pages through which the users may navigate in order to achieve one or more goals of the application.

The interaction of the users with the application is tracked autonomously of the application meaning that there may be no prior knowledge of the application with respect to, for example, a layout, an appearance, a structure, a user navigation flow (progress), an objective(s), a usage mode(s), a user interface, an operation mode(s) and/or the like. Rather than interacting with the application, the user interaction is tracked by monitoring actions made by the users with the application through one or more user interfaces of the client terminal(s), for example, a keyboard, a pointing devices interface, a touch surface, a display, an audio interface and/or the like.

In particular, displayed objects presented in one or more pages of the application are identified and assigned with a description for later identifying each of the displayed objects. Similarly each of the pages of the application may be identified and assigned with a description. Once the pages and the displayed objects are identified, actions (interaction) of the users with the identified pages and/or the identified displayed objects may be tracked by monitoring the user interfaces.

The collected actions may be sent to one or more servers for analysis and/or classification to identify one or more characteristics of the application structure and/or one or more behavioral patterns of the users using the application. Based on the tracked actions, a model of the application may be created to represent the application, for example, a flow model. The analysis of the actions may be conducted with respect to the created model to identify the behavioral patterns of the users. Furthermore, the analysis of the model may be applied for identifying one or more objectives of the application, i.e. reasoning one or more operational characteristics of the application, for example, logic, a flow, architecture, the layout, an objective and/or the like.

Based on the identified behavioral pattern(s), the servers may generate the recommendation(s) for adapting the application in order to improve utilization of the application, i.e. improve application goal(s) accomplishment by one or more of the users. The goal(s) of the application may be identified by monitoring execution and usage of the application, i.e. without having prior knowledge of the application, its structure and/or objective(s). The recommendation(s) may be forwarded to the provider (vendor) of the application to allow adaptation of the application. Optionally, one or more of the recommendations are sent to the client terminal that may locally adapt the application according to the recommendation(s).

Autonomously tracking the interaction of the users with the application and analyzing the interaction to identify the behavioral pattern(s) and generate the recommendations may present significant advantages. User experience and/or the ability of the users to comprehend the application flow, required actions, and/or the like may have a major effect on the level of accomplishment of the goal(s) expected by the application provider from the users using the application. By tracking a plurality of users using the application and identifying the behavioral pattern(s) of the users the application may be adapted to significantly improve the application layout, the user experience and/or the like to make the application, for example, more intuitive, more user friendly, more goal(s) oriented and or the like. This in turn may significantly increase the probability of the users accomplishing the goal(s) set for the application.

Applying big data analytics, machine learning and/or statistical tools over interaction of the plurality of the users with the application may allow identifying accurately the behavioral pattern(s) and generate efficient adaptation recommendation(s) according to the detected behavioral pattern(s).

While some existing methods for analyzing application interaction may exist they may mostly be integrated with the application itself thus restricting the analysis to the application provider and/or its partners. By autonomously tracking the interaction of the users with the application, the tracking, analysis and application improvement may be completely detached from the application itself making it possible to independently track and analyze the application and improve one or more aspects of the application externally without having to interact with the application directly. The autonomous tracking and analysis may therefore be applied to a plurality of applications with no need for support and/or Application Programing Interface (API) provisions from the applications' providers.

Moreover, since the interaction tracking and the analysis may be done autonomously from the application, they may be done for a plurality of application and use knowledge and/or experience accumulated for previously analyzed application(s) to analyze one or more applications presenting similar aspect(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable medium may be a computer readable signal medium or a computer readable storage medium. Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
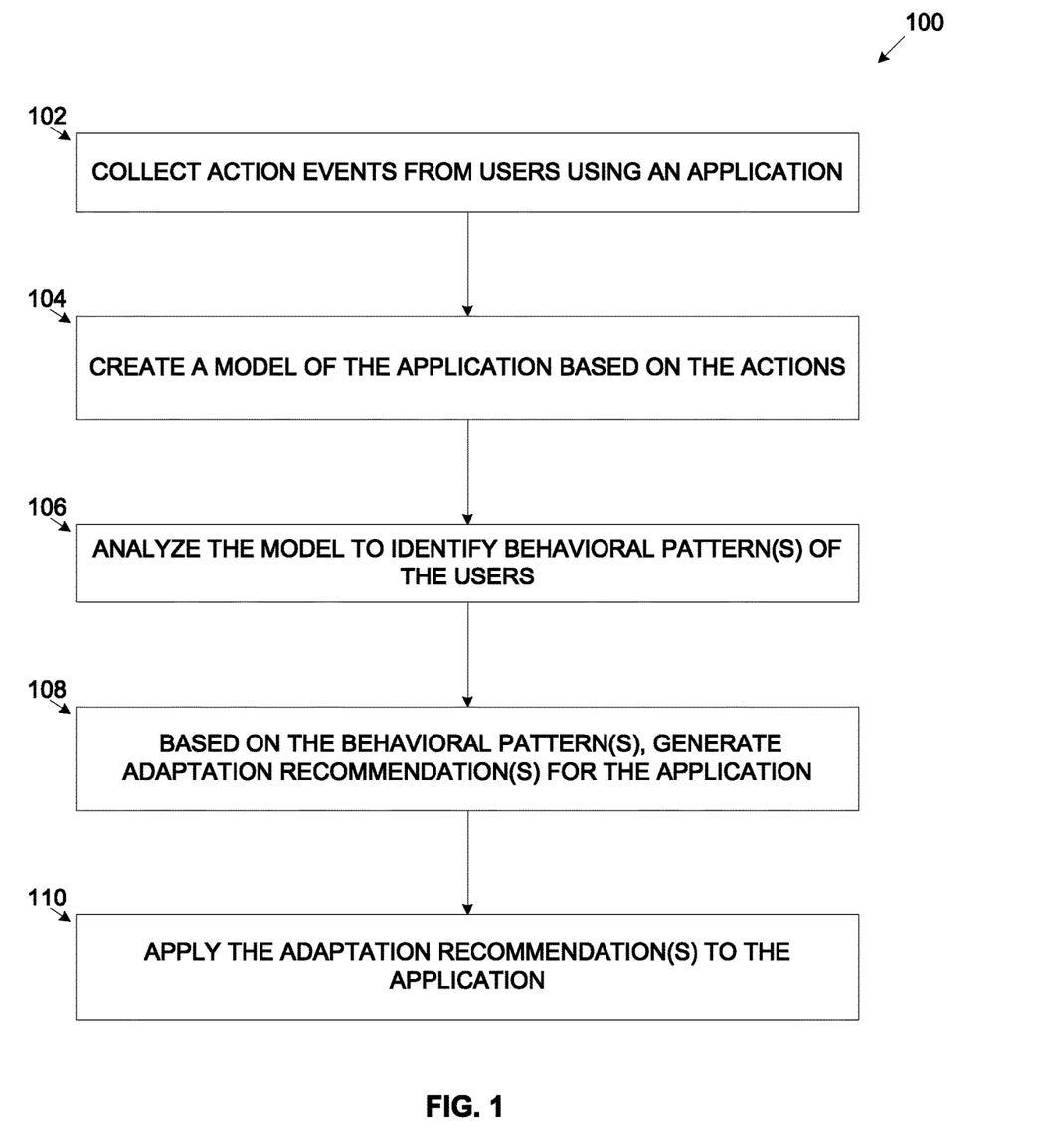
FIG. 1 is a flowchart of an exemplary process for analyzing interaction of a plurality of users with an application to generate recommended adaptation(s) to the application to increase accomplishment of application goal(s), according to some embodiments of the present invention.

Referring now to the drawings, FIG. 1 illustrates a flowchart of an exemplary process for analyzing interaction of a plurality of users with an application to generate recommended adaptation(s) to the application to increase accomplishment of application goal(s), according to some embodiments of the present invention. A process 100 may be executed to analyze a plurality of actions made by a plurality of users interacting with an application to identify one or more usage behavioral patterns and generate one or more recommendations for adapting the application in order to increase probability of the users accomplishing one or more goals of the application. The application executed on client terminals used by the users may be, for example, a local application, a website accessible using a web browser, a service provided by a local agent and/or the like. The application and/or website may comprise one or more pages through which the users may navigate in order to achieve one or more goals of the application.

The process may be executed autonomously, i.e. having no prior knowledge of the application, by analyzing actions (interactions) of the user with the application made through one or more user interfaces of the client terminals. The plurality of actions are monitored by first identifying one or more displayed objects presented by the application through the user interface(s), for example, a GUI displayed on a display of the client terminal and monitoring the interaction made by the users with the identified object(s). In particular, the displayed objects are identified in correlation with the user actions.

The actions may be collected and transmitted to one or more servers that analyze and/or classify the plurality of actions to identify one or more characteristics of the application structure and/or one or more behavioral patterns of the users using the application. Based on the identified behavioral pattern(s), the server(s) may generate the recommendation(s) for adapting the application in order to improve utilization of the application, i.e. improve application goal(s) accomplishment by at least one of the users. The goal(s) of the application may be identified by monitoring execution and usage of the application, i.e. prior knowledge of the application, its structure and/or objective may not be required for the process 100. The recommendation(s) may be forwarded to the provider (vendor) of the application to allow adaptation of the application. Optionally, one or more of the recommendations are transmitted to the client terminal that may locally adapt the application according to the recommendation(s).

Naturally, the process 100 may be applied to monitor, analyze and generate recommendations for a plurality of applications. However, for brevity, the process 100 is described for monitoring, analyzing and generating recommendations for a single application.

Figure 2:
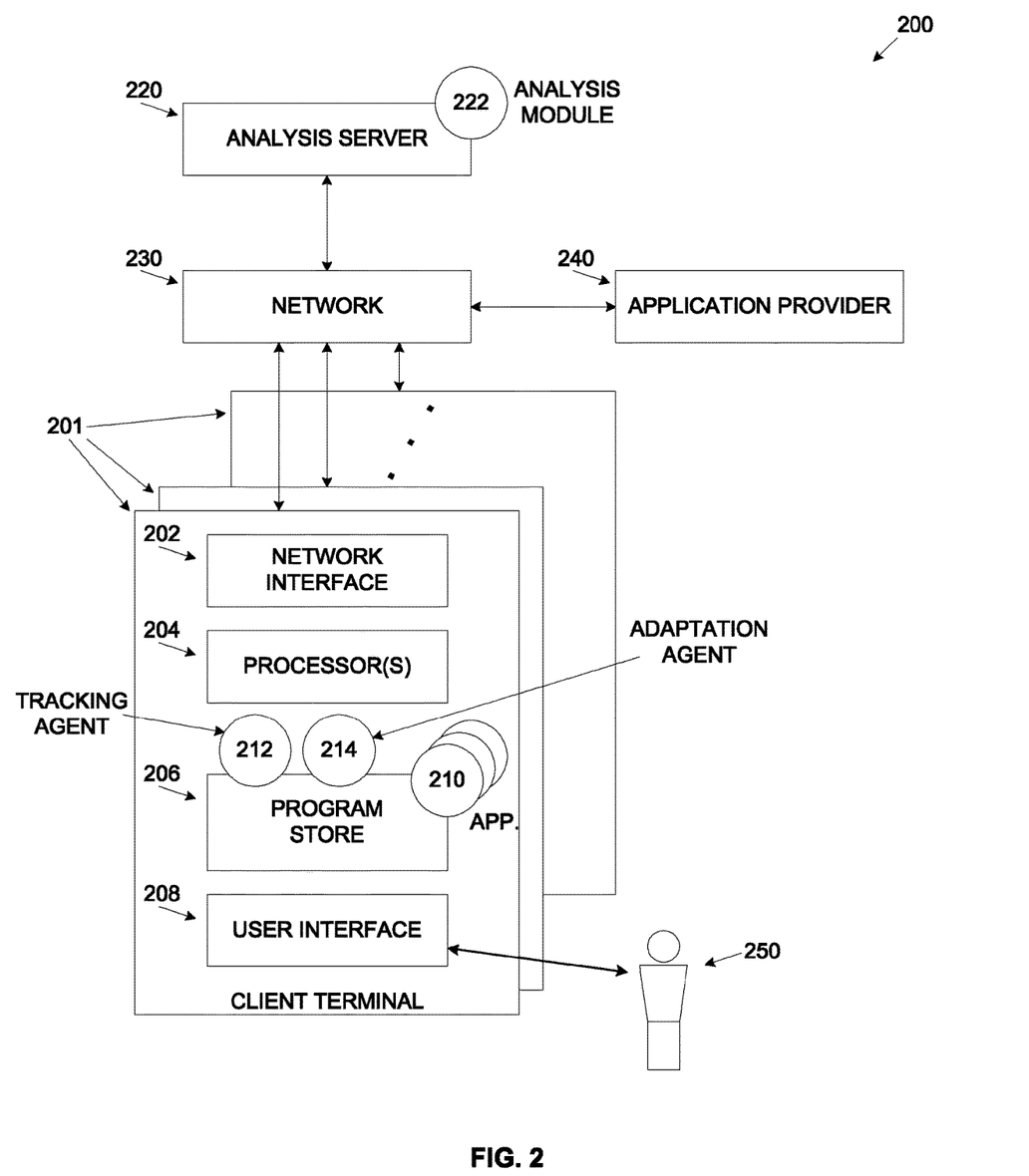
FIG. 2 is a schematic illustration of an exemplary system for analyzing interaction of a plurality of users with an application to generate recommended adaptation(s) to the application to increase accomplishment of application goal(s), according to some embodiments of the present invention.

Reference is also made to FIG. 2, which is a schematic illustration of an exemplary system for analyzing interaction of a plurality of users with an application to generate recommended adaptation(s) to the application to increase accomplishment of application goal(s), according to some embodiments of the present invention. A system 200 for executing an application usage analysis process such as the process 100 comprises a plurality of client terminals 201, for example, a Smartphone, a tablet, a smart watch, a laptop, a desktop, a work station and/or the like. Each of the client terminals 201 may include a network interface 202, a processor(s) 204, a program store 206 and a user interface 208. The network interface 202 may provide one or more interfaces, wired and/or wireless for connecting to one or more networks 230, for example, a Local Area Network (LAN), a Wireless LAN (WLAN) (e.g. Wi-Fi), a cellular network interface and/or the like.

The processor(s) 204, homogenous or heterogeneous, may be arranged for parallel processing, as clusters and/or as one or more multi core processor(s). The program store 206 may include one or more non-transitory persistent storage devices, for example, a Flash array, a Solid State Disk (SSD)

and/or the like. The program store 206 may further be utilized through one or more volatile memory devices, for example, a Random Access Memory (RAM) device used to store program code downloaded from one or more remote locations over the network interface 202 and/or from an external device, for example, a memory stick, a Flash card and/or the like. The user interface 208 may include a one or more human-machine interfaces, for example, a keyboard, a pointing devices, a touch surface, a display, an audio interface and/or the like for interacting with an associated one of a plurality of users 250. The user interface 208 may be used to present the user 250, for example, a graphic user interface (GUI) utilized through the human-machine interface(s).

The processor(s) 204 may execute one or more one or more software modules, wherein a software module may be, for example, a process, an application, an agent, a utility and/or the like each comprising a plurality of program instructions stored in a non-transitory medium such as the program store 206 and executed by one or more processors such as the processor(s) 204. The processor(s) 204 may execute one or more applications 210 each comprising one or more software modules. The processor(s) 204 may execute a tracking agent 212 comprising one or more software modules for monitoring and collecting interaction of the user 250 with the application 210.

The processor(s) 204 may further execute an adaptation agent 214 for applying one or more adaptation recommendation for the application. It is emphasized that the tracking agent 212 and/or the adaptation agent 214 are completely independent of the application 210 and do not interact with the application 210. The application 210 may be, for example, an application locally executed by the client terminal 201. Moreover, the application 210 may be a website and/or a web application available from one or more remote servers, for example, a processing node, a processing cluster, a cloud computing service and/or the like. The application 210 may further be a service delivered by the remote server(s), for example, a remote service, a cloud service, a Software as a Service (SaaS), a Platform as a Service (PaaS) and/or the like that is accessible using one or more agents locally executed by the client terminal 201.

The process 100 is directed to analyze one or more of the applications 210 regardless of whether the application 210 is an application locally executed by the client terminal 201 or provided by the remote server(s) and accessible through a web browser executed by the client terminal 201 and/or the agent locally executed by the client terminal 201. Therefore in case the application 210 is a website, a web application and/or a service accessed by the user 250 using a web browser and/or a local agent executed by the client terminal 201, the application 210 refers to the website and/or the service respectively rather than the web browser and/or a local agent serving as an access tool. As mentioned before, while the process 100 may be applied to a plurality of applications 210, for brevity, the process 100 is escribed for a single application 210.

Through the network interface 202, the tracking agent 212 executed by one or more of the client terminals 201 may communicate with an analysis server 220 executing an analysis module 222. The analysis server 220 may be utilized through one or more remote processing nodes, for example, a server, a cluster of processing nodes, a website server and/or the like. The analysis server 220 may be further utilized through, for example, a remote service, a cloud service, a SaaS, a PaaS and/or the like. The analysis module 222 comprising one or more software module may be executed for analyzing the collected interaction of the user(s) 250 with the application 210 received from the tracking agent(s) 212, identifying behavioral pattern(s) of the user(s) 250 and generating recommendation(s) for adapting the application 210 in order to allow one or more of the users 250 to better accomplish one or more objectives of the application 210. The analysis module 222 may communicate with one or more application providers 240 that provide the application 210 in order to forward the recommendation(s) for adapting the application 210.

As shown at 102, the process 100 starts with the tracking agent 212 executed on one or more of the plurality of client terminals 201 used by one or more of the plurality of users 250 monitoring (tracking) interaction of the associated user(s) 250 with the application 210. The tracking agent 212 is executed autonomously of the application 210, i.e. the tracking agent 212 may have no prior information of the application 210 with respect to, for example, a layout, an appearance, a structure, a user navigation flow (progress), an objective(s), a usage mode(s), a user interface, an operation mode(s) and/or the like.

Since the tracking agent 212 is autonomous of the application 210, in order to monitor the interaction of the user 250 with the application 210 executed on the associated client terminal 210, the tracking agent 212 analyzes the user interface 208 used by the application 210 to interact with the user 250, for example, the display, the keyboard, the pointing device and/or the like.

The tracking agent 212 may first identify one or more objects presented by the application 210 to the users through, for example, a GUI displayed to the user 250 on a display of the client terminal 201. Moreover, the application 210 may comprise a plurality of pages through which the user 250 may navigate using the GUI in order to accomplish one or more goals of the application 210. The tracking agent 212 may therefore analyze each of the page(s) of the application 210 to identify the page(s) as well as identifying the displayed object(s) presented in each of the pages(s). In particular the tracking agent 212 identifies the displayed objects as well as the pages with correlation to one or more actions the user 250 makes to interact with the displayed objects and/or the pages.

Every time a page of the application 210 is loaded, the tracking agent 212 analyzes the loaded page, for example, a Document Object Model (DOM), a web page, an application screen and or the like to identify the displayed objects presented in the loaded page. The displayed objects may include, for example, a selection field, a scroll bar, drop down selection list (menu), a roll down selection list, an icon, a bookmark, a link field and/or the like. Each of the identified displayed objects may be associated with a set of one or more attributes each assigned with a respective value, for example, DOM element properties for a web page and/or other descriptive attributes for a mobile application page.

The tracking agent 212 may obtain the set of attributes of the displayed object(s) by analyzing the loaded page, for example, the DOM, the webpage and/or the like by parsing and/or analyzing the webpage content, for example, Hyper Text Markup Language (HTML) constituting the page, scripting languages included in the page and/or the like. Additionally and/or alternatively, in case the application 210 is a standalone application, for example, a mobile application, a computer application and/or the like the tracking agent 212 may obtain the set of attributes of the displayed object(s) by interacting with the application 210, for example, through an API of the application 210. The tracking agent 212 may further be integrated with the application 210, for example, using a Software Development Kit (SDK), as an add-on and/or the like to collect the set of attributes of the displayed objects.

The tracking agent 212 may then create an element description for each of the identified and classified displayed object(s). The element description may include one or more properties describing the respective displayed object, for example, an object identifier (ID), a tagName, a type, a class, a page ID of the page, a position within the page, a dimension, a color, a texture, an attribute, an xpath and/or the like. The tracking agent 212 may generate an element description object for representing each of the displayed objects, for example, a JSON object that may later be used for analyzing interaction of the user 250 with the displayed object(s) in each page of the application 210.

The tracking agent 212 may further apply one or more algorithms to analyze the content displayed by the application 210 to identify and/or classify one or more pages of the application 210 and generate a page description for each of the page(s). For example, the tracking agent 212 may identify and/or classify each of the page(s) based on the displayed objects detected in the presented page. For each loaded page, the tracking agent 212 may aggregate data for the entire page, for example, the object ID of all the displayed objects identified in the page, the object class of all the displayed objects identified in the page and/or the like. Similarly to the displayed object description, the tracking agent 212 may group the data aggregated for each page to assign each page with a page description object, for example, a JSON object representing the respective page.

The tracking agent 212 may apply one or more algorithms, for example, a classification algorithm using for example, support Vector Machine (SVM) to the element descriptions created for each of the identified displayed objects in order to classify the displayed object(s). In many scenarios, one or more of the displayed objects may seem different when presented in different pages and/or at a different location in the loaded page. For example, a "Save" selection button, an "Add to Cart" symbol and/or the like may be presented differently by different pages of the application 210. In another example, one or more displayed objects may look different when presented in different locations of the loaded page, for example, when zooming in/out of the page, the displayed objects may change their dimensions, resolution and/or the like. Based on the classification model, the tracking agent may identify and consistently classify the displayed object(s) regardless of the location and/or appearance of the displayed objects in the loaded page(s). Similarly, the tracking agent 212 may classify the page(s) of the application 210 according to the page description created for each of the page(s). Optionally, the analysis module 222 performs the analysis and classification of the displayed objects and/or pages based on the element descriptions received from the tracking agent 212.

The tracking agent 212 may further apply one or more algorithms using, for example, the support Vector Machine (SVM) for analyzing each page loaded by the application 210 to evaluate similarity of the loaded page with one of the page descriptions created for previously loaded page(s) in order to evaluate if the loaded page may be associated with a previously loaded page. The tracking agent 212 may use one or more algorithms, for example, FindElement to locate the displayed object(s) in the pages in order to compare between the pages. The tracking agent 212 may apply a pre-defined matching threshold to determine a match level of the loaded page and the respective page description(s) of the previously loaded page(s) in order to decide if the loaded page may be a previously loaded page.

After identifying and classifying the displayed objects in each loaded page, the tracking agent 212 starts monitoring (tracking) actions made by the user 250 to interact with the application 210, in particular to interact with the identified displayed objects. The tracking agent 212 generates an action event for each action made by the user 250 through the user interface 208, for example, a movement of the pointing device, a selection (click) made by the pointing device, a position of the pointing device cursor, a swipe over the touch screen and/or touch pad, a hoover over an area of the display, a text insertion and/or the like. For each of one or more actions made by the user 250, the tracking agent 212 may correlate the action with the element description created for the displayed object with which the user 250 interacts. During each page load the tracking agent 212 may correlate the action with the page description created for the loaded page. The action event generated by the tracking agent 212 may therefore include, for example, the element description of the displayed object(s) and/or the page description of the page participating in the interaction. The action event may further include additional information, for example, a time of the action, an event type, and/or the like.

The tracking agent 212 then sends the action event(s) to the analysis module 222.

The tracking agent 212 may further analyze the interaction of the user 250 with the application 210 in order to identify an active or idle user state. The tracking agent 212 may monitor and/or log the idle time during which the user 250 is not interacting with the application 210 by, for example, measuring the time between consecutive action events. The tracking agent 212 may send an action event to the analysis module 222 in case the idle time exceeds a pre-defined idle time threshold value. Complementary, once detecting an action initiated by the user 250 following the idle state, the tracking agent 212 may send an action event to the analysis module 222 to indicate the user 250 has switched to active state.

Furthermore, the tracking agent 212 may analyze the actions and/or the loaded page(s) to identify one or more errors and/or notifications presented by the application 210. The tracking agent 212 may apply one or more algorithms to detect one or more error objects in the page. The tracking agent 212 may check for one or more heuristic error properties that may indicate the error, for example, a red color, an error keyword, an error icon pattern and/or the like. The tracking agent 212 may assign an error score to each error property detected for a suspected element, for example, a suspected displayed object and/or a suspected page. In case a total score of all error properties of the suspected error exceeds a pre-defined error threshold, the tracking agent 212 may determine the respective displayed object and/or page is an actual error. The tracking agent 212 may send to the analysis module 222 an error event comprising a description of the error along with the description of the suspected element.

Optionally, the tracking agent 212 assigns a unique user ID to each user 250 in order to identify a specific user 250 over a plurality of sessions the specific user 250 conducts with the application 250. The tracking agent 212 may include the user ID with the information of the action event(s) sent to the analysis module 222 to associate the specific user 250 with the detected action(s).

Optionally, after determining that sufficient tracking information (action events) is collected from the tracking agent 212 for the respective user 250, the analysis module 222 indicates the tracking agent 212 to stop sending continuous action events. The analysis module 222 may set a transmission threshold value that may be used by the tracking agent 212 to collect a plurality of action events and transmit the collected action events to the analysis module 222 once the number, volume and/or type of the collected action events exceeds the transmission threshold value. This may prevent overloading the analysis module 222 while verifying the new tracking information is received by the analysis module 222.

As shown at 104, the analysis module 222 creates a model of the application 210 based on the action events received from the tracking agent 212. Typically, the analysis module 222 receives the action events from a plurality of instances of the tracking agent 212 executed on a plurality of client terminals 201 used by the plurality of users 250. Moreover, the analysis module 222 may receive the action events form the tracking agent(s) 212 for a plurality of usage sessions of the application 210 initiated by one or more of the users 250. Monitoring and tracking the interaction of multiple users 2150 over multiple sessions may allow the analysis module 222 using the users 250 as crawlers to create the model for mapping accurately one or more aspects of the application 210 layout, for example, the structure, the appearance, the user navigation flow (progress), the objective(s), the usage modes, the user interface, the operation modes and/or the like. The analysis module 222 may apply one or more statistical algorithms to identify the characteristic(s) of the application 210. The analysis module 222 may identify, for example, the navigation and/or progress flow of the users 250 through the application 210, which page(s) may be reached from other page(s), what actions may the user 250 do in order to navigate from one page to another(s), a frequency (probability) of transitioning from one page to another, time spent in one or more of the pages, which pages are key pages (in terms of traffic), which pages are isolated, which pages are redundant and/or the like. The analysis module 222 may dynamically adapt the created model based on additional action events received from additional tracking agent(s) 212 tracking interaction with the application 210. The analysis module 222 may also dynamically adapt the created model based on action events received from the tracking agent(s) 212 over time.

The analysis module 222 may further identify one or more goals expected to be accomplished by the user(s) 250 when using the application 210. Identifying the goal(s) may be done autonomously by the analysis module 222 itself executed independently of the application 210 and having no prior knowledge and/or information on the goal(s) of the application 210. The analysis module 222 may apply one or more statistical algorithms to analyze the actions of the users 250 interacting with the displayed objects of the application 210 to identify the goal(s) of the application 210. For example, the analysis module 222 may analyze a registration action, an exit action, a progress of the user 250 through the pages of the application 210, a selection action of one or more displayed objects, for example, save, buy, add to cart, support and/or the like. The analysis module 222 may apply one or more machine learning algorithms to recognize one or more common patterns, for example, an icon pattern, a text pattern and/or the like to determine the objective (goal) of the action. For example, the analysis module 222 may identify one or more keywords, for example, 'New', 'Buy', 'Upgrade', 'Save', 'Download', 'Add to Cart', and/or the like that are presented by the application 210 (displayed objects) to determine the objective (goal) of the action and hence of the application 210. The analysis module 222 may compare the detected displayed object(s) to one or more common patterns detected, learned and/or confirmed over time while tracking interaction of the users 250 with one or more other applications 210 in order to validate the meaning and/or objective of the action.

The analysis module 222 may model the application 210 as a flow graph comprising a plurality of nodes each representing a page of the application 210 and one or more weighted edges. Each of the edges connects a pair of the nodes where the edge weight indicates significance (probability) of a transition between a source node (page) and a destination node (page). The weight may be interpreted as the traffic volume (probability) detected during the application 210 monitoring (action events) for navigating from the respective source node (page) to the destination node (page).

Figure 3:
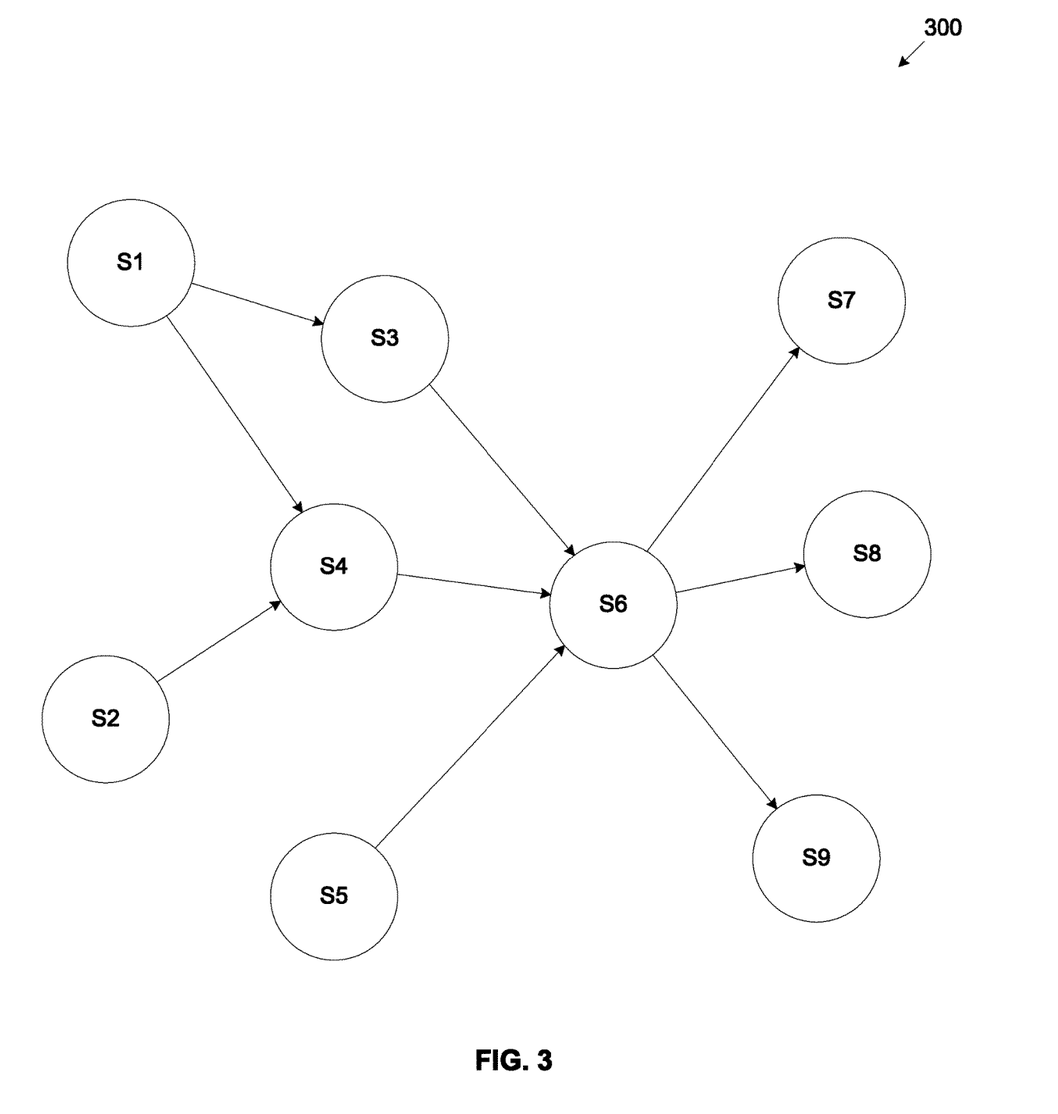
FIG. 3 is a schematic illustration of an exemplary flow graph modeled to map a flow of an exemplary application, according to some embodiments of the present invention.

Reference is now made to FIG. 3, which is a schematic illustration of an exemplary flow graph modeled to map a flow of an exemplary application, according to some embodiments of the present invention. A flow graph 300 may be created by an analysis module such as the analysis model 222 to model an application such as the application 210. The flow graph 300 includes a plurality of nodes S1, S2, S3, S4, S5, S6, S7, S8 and S9 each representing a page of the application 210. The flow graph 300 includes edges connecting pairs of the nodes S1 through S9. Based on action events received from tracking agent(s) such as the tracking agent 212, the analysis module 222 calculates a weight for each of the edges to represent the traffic volume (probability) for transitioning from the respective source node $S_S$ (page) to the destination node (page) $S_D$.

Reference is made once again to FIG. 1 and FIG. 2.

As shown at 106, the analysis module 222 analyzes the created model to identify one or more behavioral pattern of at least some of the users 250 interacting with the application 210. By identifying the behavioral pattern(s), the analysis module 222 may determine ("understand") the behavior of the users 250 and possibly the logic and/or motivation for the behavior of the users 250. The analysis module 222 may determine the real meaning and purpose of a displayed object, a respective page and/or the application 210 as perceived by the user(s) 250. This may be done by, for example, calculating the time period(s) spent by the user(s) 250 in the respective page, identifying the number of actions the user(s) take in the respective page, identifying a source page from where the user(s) 250 navigated to the respective page and/or the like. In order to more accurately calculate the time spent by a respective user 250 in the respective page, the analysis module 222 may subtract the idle time during which no action events are detected from the overall time the respective user 250 in the respective page to determine the actual active time the respective user 250 in the respective page.

The analysis module 222 may detect one or more failures of the application 210 and may further associate one or more of the behavioral patterns with the detected failure(s), for example, how long it takes one or more of the users 250 to resolve a certain failure. The analysis module 222 may identify this by, for example, calculating the time from an action event indicating an error event in a certain page to an action event indicating the user 250 left the page with no further failure(s).

Moreover, the analysis module 222 may apply one or more of the machine learning algorithms, for example, a decision tree to learn the behavioral patterns and associate them with goal accomplishment, partial accomplishment, failure and/or following action(s) as detected for the user(s) 250 during past interactions with the application 210.

Based on the detected and learned behavioral patterns, using the machine learning algorithms, the analysis module 222 may identify one or more implications of one or more actions taken by the user 250 at one or more key points along his navigation path within the application 210. Identifying the implication(s) may allow the analysis module 222 to determine the structure, flow and/or objective(s) of the application 210 and what actions may lead to accomplishing, partially accomplishing and/or failing to accomplish the goal(s). By comparing the actions taken by the user(s) 250 to actions taken during past interaction(s) of the user(s) 250 with the application 210, the analysis module 222 may identify one or more key points, for example, a page and/or a displayed object within the application 210.

The key point(s) may, for example, have high significance effect on the behavior of the user(s) 250, be commonly used by user(s) 250 that accomplish the goal(s), be commonly used by user(s) 250 that fail to accomplish the goal(s) (e.g. abandoning the application 210) and/or the like. By comparing the actions taken by the user(s) 250 to actions taken during past interaction session(s) of the user(s) 250 with the application 210, the analysis module 222 may further identify one or more intentions of the user(s) 250 while interacting with application 210. For example, in case a specific user 250 initiated an action that may typically (during the past sessions) indicate a certain intention of the past users 250, the analysis module 222 may assume and/or predict the specific user 250 has the same intention. For example, assuming the specific user 250 selected a specific roll down menu that was typically selected by a plurality of users 250 during the past sessions to navigate to a certain destination page, the analysis module 222 may determine that by selecting the specific roll down menu, the specific user 250 intends to navigate to the same certain destination page.

The analysis module 222 may further expose one or more barriers, for example, an action or a series of actions that are typically made by users 250 abandoning the application 210, a page that may typically present a difficulty for the user(s) 250 to progress towards the goal(s) (e.g. transitioning form a trial and/or explored product towards a registered and/or purchased product) and/or the like. The analysis module 222 may expose the barrier(s) by dividing the navigation flow and/or series of actions of the user(s) 250 to pairs and identifying the critical pair(s) between which the user(s) 250 abandoned the flow of the application 210.

The analysis module 222 may identify one or more of the behavioral patterns with respect to one or more context characteristics of the user(s) 250, for example, a geographical location, a day time, a night time, a time of day, a date, a holiday, a weekend and/or the like in order to associate the behavioral pattern(s) with the time period and/or the geographical location of the user(s) 250. This may be done by analyzing the time information provided with the action events information by the tracking agents 212. Additionally and/or alternatively, the analysis module 222 may aggregate the action events to overcome irregularity(s) detected in one or more of the behavioral patterns over the different time periods.

The analysis module 222 may identify one or more of the behavioral patterns with respect to one or more user segments of the users 250 according to one or more properties of the users 250, for example, a gender, an age, a heavy user, a light user, an experienced user, a novice user, a geographical location, a type of the client terminal 201, a type of browser used by the user 250 and/or the like. The analysis module 222 may apply one or more machine learning clustering algorithms, for example, K-Means to cluster at least some of the users 250 to the user segments and associate the user segments with one or more of the behavioral patterns.

The analysis module 222 may identify one or more behavior characteristics of the users 250, for example, time spent in one or more of the pages, a total time spent interacting with the application 210, typical navigation flow through the application 210, typical actions, encountered errors, frequency of using the application 210 and/or the like and associate between the users segments and typical behavioral pattern(s). The analysis module 222 may further correlate between one or more of the user segments and level of accomplishment and/or failure to accomplish one or more of the goals of the application 210. This may be done by applying one or more of the statistical algorithms to identify intersection groups between the user segments and the users 250 of these user segments that accomplished, partially accomplished and/or failed to accomplish the application 210 goal(s).

Optionally, the analysis module 222 predicts a future behavior of the user(s) 250 according to the action(s) detected during interaction of the user(s) 250 with the application 210 based on knowledge collected from at least some of the users 250 during past interaction of the user(s) 250 with the application 210. The analysis module 222 may identify one or more indicators that may allow prediction of the future behavior, for example, a certain selection action, a transition to a certain page, using a certain feature and/or the like.

Optionally, as described before, in order to prevent overload, the analysis module 222 may determine that sufficient tracking information (action events) is collected from the tracking agent 212 for one or more certain users 250 and indicate the respective tracking agents 212 to stop sending action events. The analysis module 222 may periodically check the amount and/or type of tracking information collected for the certain user(s) 250 and may subsequently instruct the respective tracking agent(s) 212 to send the action events. The analysis module 222 may also set a transmission threshold value that may be used by the tracking agent 212 to collect a plurality of action events and transmit the collected action events to the analysis module 222 once the number, volume and/or type of the collected action events exceeds the transmission threshold value.

As shown at 108, based on the identified behavioral pattern(s), the analysis module 222 may generate one or more recommendations for adapting the application 210 in order to increase probability of goal(s) accomplishment by the users 250 using the application 210. The analysis module 222 may also generate one or more recommendations to improve a user interface and/or a user experience of the application 210. The adaptation recommendation(s) may relate to one or more of the displayed objects in one or more of the pages as well as to the pages themselves. The adaptation recommendation(s) may include, for example, adding, removing, changing, relocating and/or the like one or more of the displayed objects and/or pages in order to adapt one or more aspects of the application 210 layout, for example, the structure, the appearance, the user navigation flow (progress), the objective(s), the usage modes, the user interface, the operation modes and/or the like.

For example, the analysis module 222 may identify a behavioral pattern in which at least some of the users 250 typically abandon the application 210 when reaching a barrier page in the navigation (progress) flow through the application 210. The analysis module 222 may then identify that the barrier page may be improved to assist the users 250 by applying one or more adaptations to the application 210 layout, for example, adding an instruction displayed object to the users interface in the barrier page, changing the navigation flow between pages and/or the like.

In another example, the analysis module 222 may identify a behavioral pattern in which one or more pages are a "corridors" page which is only used to progress to another page. The analysis module 222 may identify the corridor page by calculating the time spent by the users 250 in a certain page and in case the spent time is below a pre-defined time threshold, for example, 5 seconds, the analysis module 222 determines the certain page is a corridor page. In such case the analysis module 222 may recommend one or more adaptations to the application 210 layout to bypass the corridor pages in order to simplify the navigation path of the users 250 and increase the probability for accomplishing the goal(s) of the application 210.

In another example, the analysis module 222 may identify a behavioral pattern in which a specific displayed object, for example, an "Add to Cart" icon is rarely selected in a specific page. The analysis module 222 may further identify that the "Add to Cart" icon is not sufficiently prominent in the page, i.e. the icon may be easily neglected by at least some of the users 250. In such case the analysis module 222 may recommend one or more adaptations to the application 210 layout to improve visibility of the "Add to Cart" icon, for example, relocate the icon in the page, modify a color of the icon and/or the like.

Optionally, the analysis module 222 generates one or more of the adaptation recommendations with respect to one or more user segments of the users 250. For example, the analysis module 222 may recommend an adaptation to the application 210 that should be applied for novice users of the users 250 while not applied for experienced users of the users 250.

Optionally, the analysis module 222 generates one or more of the adaptation recommendations based on knowledge acquired by analyzing one or more other applications presenting one or more similar aspects as the application 210, for example, the structure, the appearance, the user navigation flow (progress), the objective(s), the usage mode(s), the user interface, the operation mode(s) and/or the like.

Figure 4:
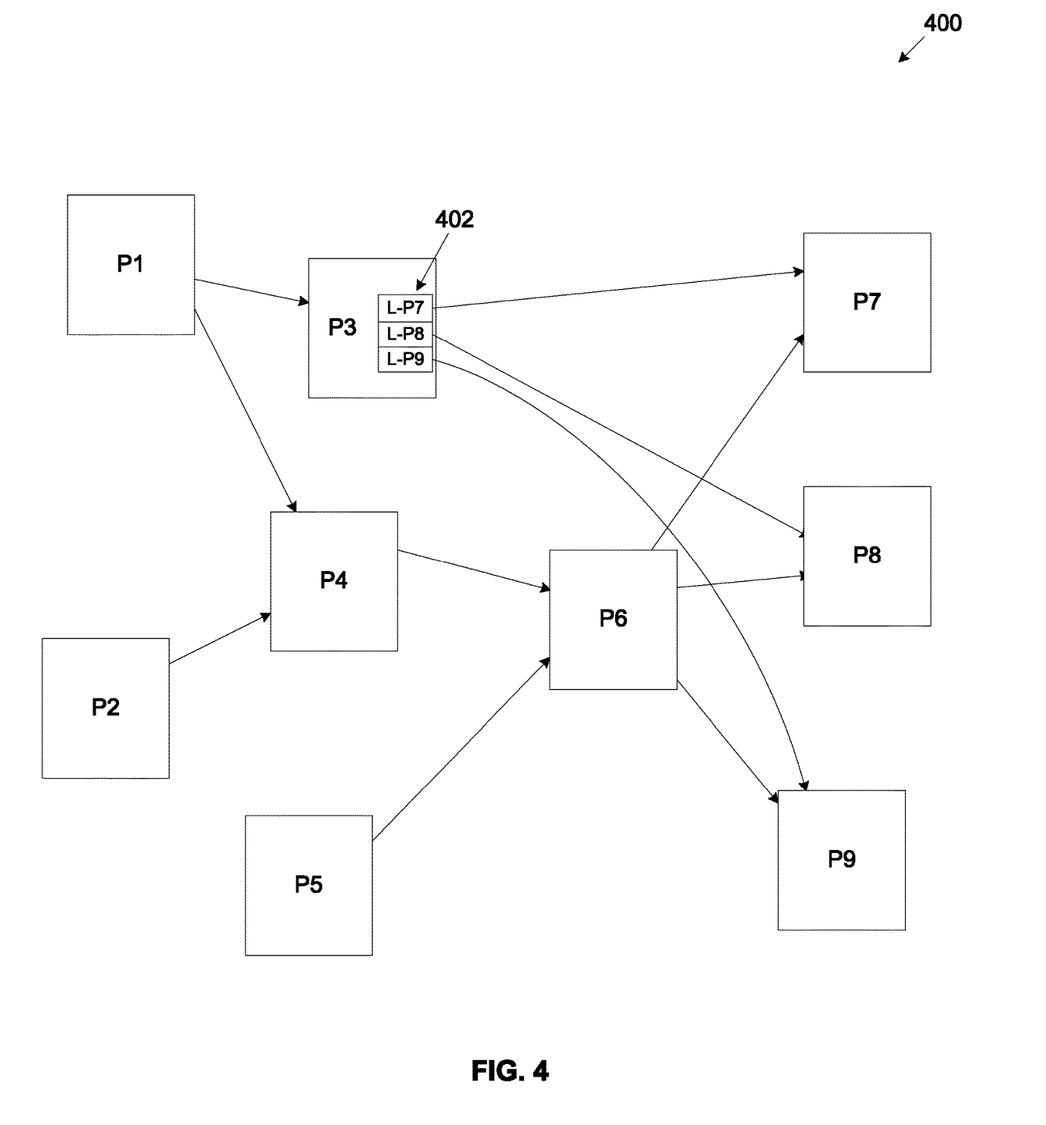
FIG. 4 is a schematic illustration of a recommended adaptation suggested for an exemplary application, according to some embodiments of the present invention.

Reference is now made to FIG. 4, which is a schematic illustration of a recommended adaptation suggested for an exemplary application, according to some embodiments of the present invention. An exemplary application such as the application 210 is represented by flow graph such as the flow graph 300 created by an analysis module such as the analysis module 222. The application 210 include pages P1, P2, P3, P4, P5, P6, P7, P8 and P9 represented by nodes of the flow graph 300 such as the nodes S1, S2, S3, S4, S5, S6, S7, S8 and S9 respectively. Analyzing the flow model 300 the analysis module 222 may identify a behavioral pattern in which at least some users 250 arriving at the page P6 from the page P3 typically spend very little time, for example, below the pre-defined time threshold before proceeding to the following page(s), for example, P7, P8 or P9. The analysis module 222 may therefor determine the page P6 is a corridor page and recommend adapting the application 210 by adding a link menu 402 in the page P3. This may allow users 250 to directly navigate from the page P3 directly to their desired destination page P7, P8 or P9 by selecting a respective link L-P7, L-P8 or L-P9 respectively without first going through the page P6. This may shorten the navigation (progress) path of one or more of the users 250 through the application 210 without altering the progress path thus improving the user experience and possibly increase the probability for successfully accomplishing the goal(s) of the application 210.

Reference is made once again to FIG. 1 and FIG. 2.

As shown at 110, one or more of the recommended adaptions may be applied to the application 210. The analysis module 222 may forward the recommended adaption(s) to the application provider 240 providing the application 210 that may in turn apply one or more of the recommended adaptions to the application 210. The analysis module 222 may be further configured to alert the application provider 240 of one or more changes to the behavior of the users 250. This means that in case the analysis module 222 identifies one or more changes in the behavioral patterns, for example, a new behavioral patterns, an altered behavioral patterns an abandoned behavioral patterns and/or the like, the analysis module 222 may inform the application provider 240.

Optionally, the analysis module 222 creates one or more elements to implement one or more of the recommended adaptions. For example, the analysis module 222 may create, remove, change and/or relocate one of more display elements that may be overlaid over one or more pages of the applications 210 to apply the recommended adaption(s). The analysis module 222 may send the created display element(s) to one or more of the adaptation agents 214 executed on one or more of the client terminals 201 to present the created display element(s) according to the recommended adaption(s) when the application 210 is executed and used by the associated user 250. Since the adaptation agent 214 is independent of the application 210, the adaptation agent 214 may use the user interface 208 used by the application 210, for example, the display to change the appearance of the application 210 and present the created display element(s). The crated element(s) may include additional elements to the application 210, hiding displayed object(s) of the application 210, modifying a color, shape and/or appearance of the displayed object(s) of the application 210 and/or the like.

For example, the analysis module 222 may identify a behavioral pattern in which at least some users 250 are conducting a step (e.g. an action a group of actions and/or the like) that does not advance them towards the goal(s) of the application 210 and/or causes them to erroneously navigate through the pages of the application 210. In such case the analysis module 222 may recommend to add a guidance instruction text to guide the users 250 through the required action(s). The analysis module 222 may create a guidance instruction display element and send it to the adaptation agent 214 to overlay the guidance instruction display element at the appropriate location in the appropriate page of the application 210.

As discussed before, the analysis module 222 may create one or more sets and/or variations of the display element(s) each targeting one or more of the users segments. Each user 250 may be associated with one or more of the users segments according to one or more hypothesis tests, for example, an A/B test (also known as bucket tests or split-run testing) and/or the like. The adaptation agent 214 may then apply the set and/or variation of the display element(s) targeting the user segment(s) to which the respective user 250 is associated. This implies that different users 250 may be presented with different adaptations to the application 210.

It is expected that during the life of a patent maturing from this application many relevant systems, methods and computer programs will be developed and the scope of the term client terminal user interfaces is intended to include all such new technologies a priori.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of adapting an application according to user interaction, comprising:
   using at least one processor for executing a code for:
   collecting autonomously a plurality of action events describing a plurality of actions taken by a plurality of users to navigate through a plurality of pages presented by an application to accomplish at least one goal of said application, said plurality of pages presented on a graphical user interface (GUI) at a plurality of user devices used by said plurality of users, wherein said autonomously collecting the plurality of action events is conducted with no prior knowledge of said application, and does not cause interaction with said application, and wherein said code is distinct from code for said application;
   analyzing said plurality of action events to identify at least one behavioral pattern of at least some of said plurality of users for accomplishing said at least one goal; and
   generating automatically at least one recommended adaptation for said application according to said at least one behavioral pattern to adapt a layout of said application in order to increase a probability for at least one user to successfully accomplish said at least one goal.

2. The computer implemented method of claim 1, wherein said application is a web based application accessible by a web browser used by at least one of said plurality of users.

3. The computer implemented method of claim 1, wherein said application is a local application executed locally by a device associated with one of said plurality of users.

4. The computer implemented method of claim 1, further comprising each of said plurality of users is assigned a unique identification tag to identify said each user in a plurality of sessions in which said each user uses said applications.

5. The computer implemented method of claim 1, wherein said plurality of action events are identified by identifying at least one of a plurality of displayed objects in each of said plurality of pages and detecting at least one action of said plurality of actions made by at least one of said plurality of users to interact with said at least one displayed objects, said action is a member of a group consisting of: select, point, click, swipe, hover, and type.

6. The computer implemented method of claim 1, wherein said analysis is conducted on a flow graph model created to represent said application, said flow graph model includes a plurality of nodes each associated with one of said plurality of pages and a plurality of edges each connecting a pair of said plurality of nodes, each of said plurality of edges is assigned with a weight indicating a probability of transition between a respective pair of said plurality of pages.

7. The computer implemented method of claim 1, wherein said analysis comprises analyzing said plurality of action events taken by at least one of said plurality of users over a plurality of sessions in which said each user uses said applications.

8. The computer implemented method of claim 1, wherein said analysis automatically identifies said at least one goal by analyzing at least some of said plurality of actions.

9. The computer implemented method of claim 1, wherein said analysis comprises identifying at least one error made by at least one of said plurality of users in at least one of said plurality of pages.

10. The computer implemented method of claim 1, wherein said analysis comprises clustering said plurality of users to a plurality of user segments to associate said at least one behavioral pattern with at least one of said plurality of user segments.

11. The computer implemented method of claim 1, wherein said analysis comprises:
identifying at least one barrier page of said plurality of pages, said at least one barrier page reduces said probability for at least some of said plurality of users to successfully accomplish said at least one goal; and
automatically determining that said at least one barrier page is improvable by adding a displayed instruction to the user interface.

12. The computer implemented method of claim 1, wherein said analysis further comprises rating a significance of each of said plurality of action events with respect to said probability.

13. The computer implemented method of claim 1, wherein said analysis further comprises analyzing an active time duration and an idle time duration spent by each of said plurality of users in each of said plurality of pages in order to determine a level of understanding of said each page by said each user.

14. The computer implemented method of claim 1, wherein said analysis further comprises analyzing at least one context characteristic of at least some of said plurality of action events to identify said at least one behavioral pattern, said at least one context characteristic is a member of a group consisting of: a time of day, a date, and a location of said user.

15. The computer implemented method of claim 1, wherein said analysis further comprises estimating at least one intention of at least one of said plurality of users by analyzing said plurality of action events initiated by said at least one user.

16. The computer implemented method of claim 1, wherein said at least one recommended adaptation includes a suggested modification to change a navigation path of said application.

17. The computer implemented method of claim 1, wherein said at least one recommended adaptation includes a suggested modification to manipulate a user interface of at least one of said plurality of pages in order to improve a user experience provided by said application.

18. The computer implemented method of claim 1, wherein said at least one recommended adaptation includes a suggested modification to manipulate at least one object displayed in at least one of said plurality of pages, said manipulation is selected from a group consisting of: addition, removal, change and relocation.

19. The computer implemented method of claim 1, wherein said at least one recommended adaptation includes a suggested modification to manipulate at least one guidance instruction presented for said application in at least one of said plurality of pages to assist said plurality of users in said navigation, said manipulation is selected from a group consisting of: addition, removal, change and relocation.

20. The computer implemented method of claim 1, further comprising providing said at least one recommended adaptation to a provider of said application.

21. The computer implemented method of claim 1, further comprising alerting a provider of said application in case a change is detected in said at least one behavioral pattern.

22. The computer implemented method of claim 1, further comprising automatically adapting said application according to said at least one recommended adaptation.

23. The computer implemented method of claim 1, wherein said autonomous collection of plurality of action events uses no Application Programing Interface (API) provision from a provider of said application.

24. A system for adapting an application according to user interaction, comprising:
at least one processor adapted to execute a code, said code comprising:
code instructions to collect autonomously a plurality of action events describing a plurality a plurality of action events describing a plurality of actions taken by a plurality of users to navigate through a plurality of pages presented by an application to accomplish at least one goal of said application, said plurality of pages presented on a graphical user interface (GUI) at a plurality of user devices used by said plurality of users, wherein said autonomous collection of the plurality of action events is conducted with no prior knowledge of said application, and does not cause interaction with said application, and wherein said code is distinct from code for said application;
code instructions to analyze said plurality of action events to identify at least one behavioral pattern of at least some of said plurality of users for accomplishing said at least one goal; and
code instructions to generate automatically at least one recommended adaptation for said application according to said at least one behavioral pattern to adapt a layout of said application in order to increase a probability for at least one user to successfully accomplish said at least one goal.

* * * * *